US012801918B2

(12) United States Patent
Mishra

(10) Patent No.: US 12,801,918 B2
(45) Date of Patent: Nov. 17, 2026

(54) IMAGE PREDICTION USING TEMPORAL DATA

(71) Applicant: PayPal, Inc., San Jose, CA (US)

(72) Inventor: Satyabrata Mishra, Bengaluru (IN)

(73) Assignee: PayPal, Inc., San Jose, CA (US)

( * ) Notice: Subject to any disclaimer, the term of this patent is extended or adjusted under 35 U.S.C. 154(b) by 357 days.

(21) Appl. No.: 18/651,193

(22) Filed: Apr. 30, 2024

(65) Prior Publication Data

US 2025/0335759 A1 Oct. 30, 2025

(51) Int. Cl.
*G06N 3/08* (2023.01)

(52) U.S. Cl.
CPC .................................... *G06N 3/08* (2013.01)

(58) Field of Classification Search
None
See application file for complete search history.

(56) References Cited

U.S. PATENT DOCUMENTS 11,200,577 B2 12/2021 Shen et al.
11,818,163 B2 11/2023 Sharma et al.
12,213,395 B2 * 2/2025 Brown .................... G06N 5/01
2021/0248607 A1 8/2021 Yerradoddi et al.
2021/0398129 A1 12/2021 Sharma
2022/0164699 A1 5/2022 Neupane et al.
2023/0140792 A1 5/2023 Jain et al.
2023/0274126 A1 8/2023 Rao et al.
2023/0316287 A1 10/2023 Pandian et al.
2024/0122578 A1 * 4/2024 Brenner ............... A61B 5/0215
2024/0370761 A1 * 11/2024 Smith .................... G06N 20/00

FOREIGN PATENT DOCUMENTS

WO 2021253223 A1 12/2021
WO 2022272262 A1 12/2022
WO WO-2023242541 A1 * 12/2023 ........... A61B 5/7232

* cited by examiner

*Primary Examiner* — Tyler W. Sullivan
(74) *Attorney, Agent, or Firm* — Kowert, Hood, Munyon, Rankin & Goetzel, P.C.; Catherine L. Gerhardt; Deam M. Munyon

(57) ABSTRACT

Techniques are disclosed for transforming user data into images for training a machine learning model based on temporal changes in the users' variables. A system receives a request from a device and retrieves a historical user data that includes variables of a user of the device. The system separates, based on a particular time interval, the historical data into subsets that include historical data for the particular time interval at different times. The system generates, based on the subsets, an image that includes rows of pixels corresponding to the variables included in the historical data and columns of pixels corresponding to the subsets placed in temporal order according to the different times at which their particular time interval occurs. Based on the image, the system determines whether to authorize the request by inputting the image into a machine learning model trained on images of historical data for different users.

20 Claims, 8 Drawing Sheets

Example Tabular Data 602 (For User 604)

| | Number of Communications | Approved Communications | Residence of User | ... |
|---|---|---|---|---|
| January 30th | 112 | 112 | Renter (1) | ... |
| February 30th | 95 | 95 | Renter (1) | ... |
| March 30th | 50 | 45 | Renter (1) | ... |
| April 30th | 54 | 54 | Renter (1) | ... |
| May 30 | 55 | 52 | Renter (1) | ... |
| June 30th | 75 | 74 | Renter (1) | ... |
| July 30th | 95 | 94 | Owner (2) | ... |
| ⋮ | ⋮ | ⋮ | ⋮ | |
| December 30th | 102 | 102 | Owner (2) | ... |

IMAGE PREDICTION USING TEMPORAL DATA

BACKGROUND

Technical Field

This disclosure relates generally to data processing, and, more specifically, to techniques for classifying tabular data, for example, using machine learning.

Description of the Related Art

As more and more systems have access to larger and larger amounts of data (often referred to as "big data"), the ability to process this data becomes paramount, particularly for analyzing and identifying patterns and anomalies in the data. For example, many systems may wish to identify an extent to which the value for a given variable included in a user's data changes over time. Often, analyzing changes in data over time is resource intensive, leading many systems to compress the data during analysis e.g., by averaging a given variable. Such compression methods, however, often cause a significant amount of information indicated in the data to be lost. For example, a single characteristic or variable of the data may be analyzed to determine what a characteristic or variable is for a given entity to which the characteristic or variable corresponds (e.g., the total payment volume of a user at a given point in time). Such analysis is often not representative of how this characteristic or variable changes at different points in time (e.g., from month to month) and there are a plethora of different types of characteristics or variables which correspond to the given entity and indicate its behavior.

Many electronic communication requests (one example of the data that may be processed), may be submitted with malicious intent, often resulting in wasted computer resources, network bandwidth, storage, CPU processing, etc. For example, if a processing system makes an inaccurate prediction that an electronic communication is safe and should, therefore, be approved, this approval may lead to wasted computing resources. Such waste may be due to the resource-intensive nature of predicting whether the electronic communication is safe using traditional techniques. Often, to decrease the amount of computing resources necessary to make such a prediction, traditional techniques attempt using data compression methods. For example, traditional techniques might calculate the average value of a variable associated with a requested electronic communication over a year instead of evaluating the value of that same variable over different days, weeks, months, etc. Said another way, an isolated data point for a given entity indicating a variable of that entity at a given time (e.g., an average variable value over a year) will not represent the entity's behavior as accurately as the analysis of multiple data points for the variable captured at different points in time (i.e., due to the ability to note changes in a characteristic over time).

DETAILED DESCRIPTION

Figure 1:
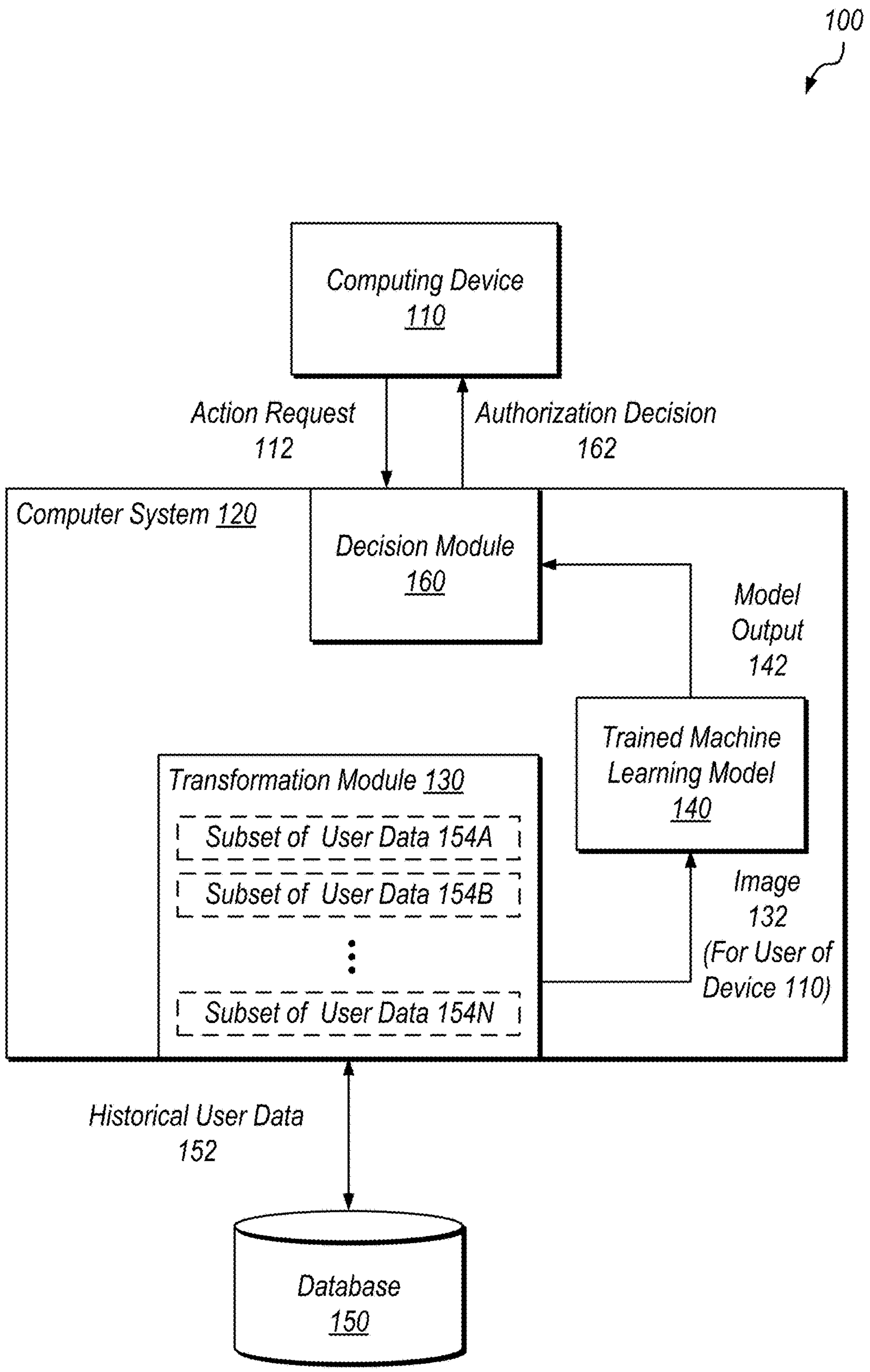
FIG. 1 is a block diagram illustrating an example system configured to generate images from historical user data for use in training a machine learning model, according to some embodiments.

As more and more data becomes available for different entities over time, processing systems fielding requests from these entities are able to perform more in-depth analyses of these entities. For example, a processing system may store data for an entity with millions of different attributes, with these attributes being updated on a monthly, weekly, or daily basis. Over time, a processing system may store these different temporal values as historical data for the different entities (e.g., users, servers, businesses, etc.) As one specific example, a processing system may process a request from a user to send an email. As another specific example, a processing system may process a request to initiate an electronic transaction. In a given day, this system may process hundreds of data transfer requests from hundreds of different servers. In this example, the processing system stores historical server data that includes different values for many attributes of the servers at different points in time.

In various situations, however, using historical data to make processing decisions is very computationally expensive. In order to decrease the amount of computational resources needed to make calculations (to be used in making predictions) for electronic communications, a processing system truncates the historical data for a given entity when performing calculations. Said another way, in order to decrease the amount of time and resources to make a prediction for an electronic communication based on historical data, a processing system uses less than an entirety of historical data available. Using less than the entirety of data is often done because attempting to process the total amount of data is far too bulky and computationally expensive. For example, instead of making a determination whether to process a given request, the processing system may utilize only one month of data rather than eighteen months of data. Such point-in-time data, however, often does not accurately capture evolving entity behaviors or trend variables that change over time. For example, changes in a given variable from month to month may be more indicative of a problem than the average of the given variables over several months). Another traditional solution requires training and maintenance of multiple different models for a given user for each different time interval of data. For example, twelve different models are often used to determine how a user's data is behaving over twelve different months with each model receiving a month of data. Such solutions, however, are quite slow and very computationally expensive, as well as requiring more training and maintenance of the twelve different models. Still further, such solutions lose the valuable sequence of month-to-month changes in the data due to the monthly data being separated between many different models.

In order to maintain the integrity of the overall historical data for a given entity, the disclosed techniques transform the overall data into an image and leverage machine learning techniques, such as image classification models to automatically analyze how the historical data differs temporally. As one specific example, the disclosed techniques may transform a set of historical user data into an image and execute a convolutional neural network (CNN) model on the image to identify abnormal patterns in an entity's behavior over different time intervals as discussed in further detail below with reference to FIG. 5. For example, transformation of data into an image allows for multiple months of data to be condensed without removing the valuable nature of the natural sequence of the data. Said another way, the disclosed techniques prevent the loss of the sequence of variable values as they change over time. As such, the disclosed electronic communication processing system is able to identify undesirable changes in one or more variables and make decisions for requests based on the undesirable changes (e.g., block than entity that submitted the request from further activity within the system).

The disclosed data transformation techniques convert a set of historical data for a given user into an image, where the rows of the image represent different time intervals of data and the columns of the image represent different variables included in the set of historical data. For example, the disclosed transformation system turns twelve months of historical user data into an image where each row of the image is for a different month and each column of the image is for a different variable of sixty different variables included in the historical user data as discussed in further detail below with reference to FIGS. 3 and 6A. After generating an image for a user from their historical data, the disclosed system feeds the image into a machine learning model trained on historical data from a plurality of different users. This trained model outputs a classification for the image.

Based on this classification, the system determines whether to approve a request received from the user. In addition, in response to detecting abnormal behavior in a given entity using the model trained on images of distribution data, the disclosed system performs one or more preventative actions. For example, the classification of the image may indicate that this user has abnormal trends in their data from the last twelve months, which in turn may indicate that current requests from this user should be denied or sent for additional review. In this example, the system may prevent the given entity from performing future actions (e.g., this user is blocked from initiating future electronic communications).

Classification of electronic communication requests using the disclosed data transformation techniques may advantageously improve both the accuracy (i.e., catch rate) of a model trained on images generated from historical user data as well as the speed at which the model can be trained and executed using the same amount of computing resources. For example, a model trained on an image generated from monthly data snapshots of variables at the end of each month over the span of a year (i.e., twelve monthly snapshots of different variables) is between two and five percent more accurate than, and has an improved catch rate relative to, a traditional machine learning model trained on an average value of each of the variables over the twelve months. Said another way, the disclosed techniques result in a model that is more accurate than traditional models in making predictions for user requests. In addition to advantageously decreasing the amount of resources (both time and computational) necessary to perform classifications of user requests, the disclosed image techniques may decrease loss (e.g., financial, user trust, etc.) associated with risky electronic communication requests.

Example Image Prediction System

FIG. 1 is a block diagram illustrating an example system configured to generate images from historical user data for use in training a machine learning model. In the illustrated embodiment, system 100 includes computing device 110, database 150, and computer system 120, which in turn includes transformation module 130, trained machine learning model 140, and decision module 160.

Computer system 120, in the illustrated embodiment, receives an action request 112 from computing device 110. Computer system 120 generates and transmits an authorization decision 162 for the request 112 to computing device 110 based on model output 142 of trained machine learning model 140. As discussed in further detail below, model output 142 may indicate that an entity (e.g., a user, a server, a merchant, etc.) that submitted request 112 is problematic in some way (e.g., the user is malicious, the server is dropping packets or is offline, the merchant is not authorized by computer system 120, etc.). After receiving request 112, computer system 120 inputs the request to decision module 160 for evaluation and executes transformation module 130 and trained machine learning model 140 to assist decision module 160 in generating an authorization decision 162 for the request. In various embodiments, request 112 is a request from a user of device 110 to perform an action such as: initiate electronic communications (e.g., a transaction, a data transmission for a server network, a text message, etc.), open a new credit line, generate a weather report, generate a medical report, locate nearby businesses, etc.

Transformation module 130, in the illustrated embodiment, retrieves historical user data 152 corresponding to one or more users from database 150. For example, when processing action request 112, transformation module 130 retrieves historical user data 152 for the user that submitted action request 112. In various embodiments, historical user data 152 includes a plurality of variables corresponding to a user of device 110 that indicate prior behavior of the user e.g., for the past day, month, year, etc. After retrieving the historical data, transformation module 130 separates historical user data 152 into multiple subsets 154A-154N based on a particular time interval. Each of the subsets 154A-154N of user data includes historical data for the particular time interval, but at different times. For example, if the particular time interval is a week, then subset 154A includes user data for the week of March $1^{st}$ to March $8^{th}$ while subset 154B includes user data for the week of March $9^{th}$ to March $16^{th}$. In some embodiments, subsets 154A-154N include historical user data for different time intervals. For example, subset 154A includes historical user data for a week time interval, while subset 154B includes historical user data for a month time interval. In some embodiments, the subsets include consecutive user data. In other embodiments, two subsets include non-consecutive user data. For example, subset 154A might include user data for the week of March $1^{st}$ to March $8^{th}$, but subset 154B includes user data for the week of March $16^{th}$ to March $23^{rd}$. In various embodiments, subsets 154A-154N of user data include a plurality of different variables associated with different users as discussed in further detail below with reference to FIG. 3.

After separating historical user data 152 into subsets 154, transformation module 130 generates an image from the separated data. For example, transformation module 130 generates an image 132 for a user of device 110 that has pixels whose values correspond to the values of user variables included in the different subsets 154A-154N. As discussed in further detail below with reference to FIGS. 3, 6A, and 6B, image 132 includes columns corresponding to user variables and rows corresponding to time intervals having the same length of time. In various embodiments, transformation module 130 performs several preprocessing procedures on the historical user data 152 in order to generate image 132 for the user of device 110, as discussed in further detail below with reference to FIG. 2.

Trained machine learning model 140 receives an image 132 for a user of device 110 from transformation module 130 and generates an output 142 indicating a prediction of the model 140 for the action request 112 based on image 132. For example, trained machine learning model 140 generates a prediction indicating whether a user whose historical data was used to generate image 132 is trustworthy. Computer system 120, in the illustrated embodiment, provides the output 142 of model 140 to decision module 160 for a final authorization decision 162 for request 112. In some embodiments, trained machine learning model 140 is an image classification model. For example, model 140 may be a convolutional neural network (CNN) model or a residual neural Network (ResNet) model.

In some embodiments, computer system 120 trains machine learning model 140 using a plurality of images previously generated by transformation module 130 based on historical user data 152 for a plurality of different users for which labels are known. For example, as discussed in further detail below with reference to FIG. 3, server system 120 may include a training module for training a machine learning model using labeled images. For example, if computer system 120 knows that a given user is suspicious (and potentially malicious), then computer system 120 assigns a label to the image for the given user indicating that this user is suspicious. Said another way, server system 120 uses its existing knowledge of different users (e.g., based on prior electronic communications) to train a machine learning model to predict whether new requests initiated by these users, or other users, are risky in some way (e.g., anomalous, suspicious, malicious, etc.).

In the illustrated embodiment, decision module 160 generates an authorization decision 162 for request 112 based on model output 142 and transmits the authorization decision to computing device 110. In some embodiments, decision module 160 compares model output 142 with one or more decision thresholds. For example, if the model output 142 indicates a classification score for image 132, then decision module 160 compares the classification score with one or more decision thresholds. If the classification score satisfies (e.g., is above, below, or the same as) one or more decision thresholds, then decision module 160 selects an authorization decision corresponding to the satisfied decision threshold. As one specific example, if model output 142 is a classification score of 0.2 and satisfies a decision threshold of 0.3, then decision module 160 determines whether or not to approve action request 112. In the illustrated embodiment, decision module 160 transmits decision 162 to computing device 110. In this example, authorization decision 162 may indicate that a request 112 for an electronic transaction has been authorized, denied, or requires additional authentication or verification. An additional authentication may involve decision module 160 including a request for an additional authentication factor in the authorization decision 162 transmitted to computing device 110.

In this disclosure, various "modules" operable to perform designated functions are shown in the figures and described in detail (e.g., transformation module 130, decision module 160, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC.

While various embodiments discussed herein are directed to user data and evaluating user requests, these examples are used for illustration purposes and are not intended to limit the scope of the disclosed invention. For example, data other than user data may be analyzed and processed using the disclosed techniques. In some embodiments, the request 112 to authorize an action is a request to authorize a communication between two or more servers in a network of servers. In such embodiments, the entity that submitted request 112 is a server included in the network of servers.

Example Transformation Module

Figure 2:
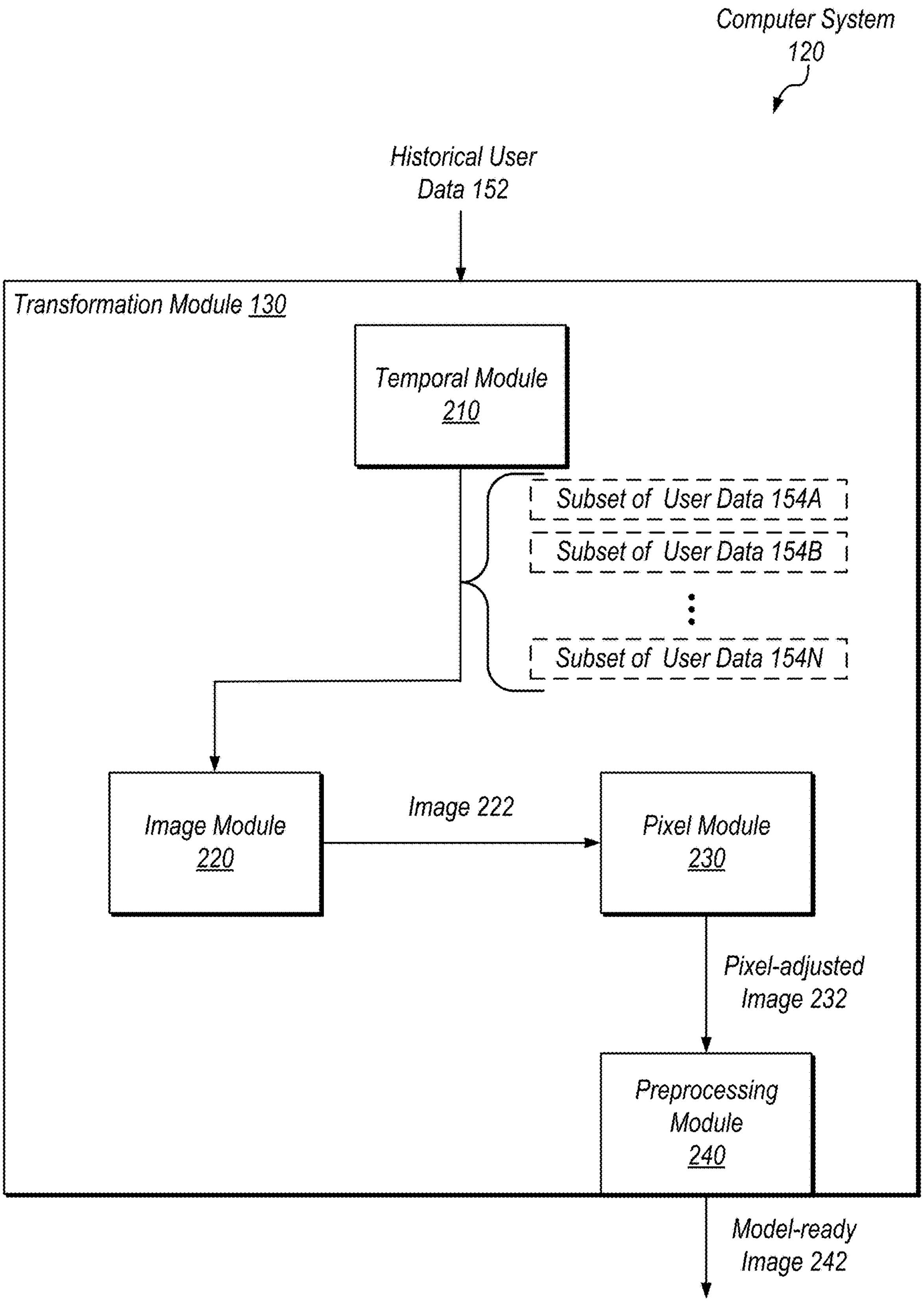
FIG. 2 is a block diagram illustrating an example transformation module, according to some embodiments.

Turning now to FIG. 2, a block diagram is shown illustrating an example transformation module. In the illustrated embodiment, computer system 120 includes transformation module 130, which in turn includes temporal module 210, image module 220, pixel module 230, and preprocessing module 240.

Transformation module 130, in the illustrated embodiment, retrieves historical user data 152 (from database 150 as shown in FIG. 1) for a user corresponding to a request (e.g., request 112 as shown in FIG. 1). Transformation module 130 inputs historical user data 152 into temporal module 210, which in turn separates historical user data 152 into a plurality of subsets 154A-154N as discussed above with reference to FIG. 1. In various embodiments, temporal module 210 separates historical user data 152 based on a predetermined time interval. Temporal module 210 may include various metrics for determining the predetermined time interval. For example, temporal module 210 may separate historical user data 152 based on a total length of time corresponding to the user data. As one particular example, if historical user data 152 includes data for 24 months, then temporal module 210 separates the data based on a month time interval. As another example, if historical user data 152 includes data for 2 months, then temporal module 210 separates the data based on a week time interval. In this way, different users' data may be separated based on different intervals of time. For example, a first user has subsets of user data that are a month long, while a second user has subsets of user data that are a week long. In other situations, temporal module 210 may receive a plurality of different predetermined time intervals input by a system administrator. In these situations, temporal module 210 separates different users' data according to the predetermined time intervals based on the total amount of historical user data being separated according to historical user data thresholds corresponding to the different predetermined time intervals. For example, a first user's data is separated according to a month predetermined time interval when this user's historical data satisfies a user data threshold of twelve months of data.

In addition to separating historical user data 152 into subsets 154A-154N of user data, temporal module 210, places the subsets 154 in sequential order. For example, subset 154A includes data that occurs for a user during a time interval immediately prior to the time interval in which data within subset 154B occurs, and subset 154B includes data that occurs during a time interval immediately prior to the time interval in which data within subset 154C occurs, and so forth. In this way, temporal module 210 captures the temporal aspect of the historical user data by arranging the subsets 154 in sequential order prior to providing the subsets 154 of user data to image module 220.

Image module 220, in the illustrated embodiment, receives subsets 154A-154N of user data from temporal module 210 for a user corresponding to a request (such as request 112 shown in FIG. 1). Image module 220 generates an image 222 based on the subsets 154A-154N of user data and transmits the image 222 to pixel module 230. Image module 220 generates image 222 by first calculating average values for each variable within each of the subsets 154A-154N. For example, image module 220 calculates the average value for each of sixty different variables within subset 154A, calculates the average value for each of the sixty different variables within subset 154B, etc.

Image module 220 places the subsets 154 of user data into a table, with rows corresponding to the different time intervals of subsets 154 and columns corresponding to the average variable values included in those subsets. When placing the subsets 154 of data into the table, image module 220 maintains the temporal order of the data established by temporal module 210. An example variable included in subsets 154 may be an engagement count variable e.g., indicating the number of times a user has interacted with an application on their computing device 110. As one example of the table generation, if image module 220 receives twelve different subsets 154 of user data from temporal module 210 with each subset including sixty different variables, then image module 220 generates a table with twelve rows and sixty columns storing values corresponding to the sixty different variable values during the different time intervals of the subsets 154.

After generating a table storing the different variable values of the subsets of user data, image module 220 transforms the table into a 3-dimensional (3D) array. As discussed in further detail below with reference to FIG. 3, the table stores tabular data for a user. When transforming the table into a 3D array, image module 220 transforms the table into the following three dimensions having the values 60×12×1: a variable dimension (60 variables), a time interval dimension (12 different time intervals), and a user dimension (this image is generated for a single user corresponding to request 112). Image module 220 generates an image for the user by treating each row of the 3D array as an image, resulting in an image that has 60 rows and 12 columns. The intersection of the rows and columns include values that represent the average values of 60 different variables over 12 different time intervals. For example, each box included in the image that is the intersection of the rows and columns includes a number value. Each row in the image generated by image module 220 represents a different variable at a specific point in time. The sequential rows of variable values at different points in time enable the trained machine learning model 140, discussed above with reference to FIG. 1, to discern temporal patterns in the historical user data 152. For example, image 222 advantageously provides a condensed version of historical user data 152 while also preserving the changes in user data over time.

Pixel module 230, in the illustrated embodiment, receives image 222 from image module 220 and generates and outputs a grayscale pixel-adjusted image 232. For example, pixel module 230 maps the values of the different variables included in each box of image 222 to a grayscale pixel-adjusted image 232. In this example, pixel module 230 assigns different pixel intensities to each box of image 222 based on the values stored in each box. Said another way, the intensity of the grayscale pixels that make up image 222 represent the different values of variables. As one example, a larger variable value is represented by a darker pixel (a lower pixel intensity), while a smaller variable value is represented by a lighter pixel (a higher pixel intensity).

Preprocessing module 240, in the illustrated embodiments, receives pixel-adjusted image 232 from pixel module 230 and performs one or more preprocessing procedures on the image 232. In some embodiments, preprocessing module 240 performs z-scaling to ensure that none of the variable values are out-of-bounds for image 232. For example, z-scaling prevents an image from having distorted pixel values by normalizing the pixel values to a standardized scale. As used herein, the term "z-scaling" is intended to be construed according to its well-understood meaning, which includes altering the values of multiple different variables such that they are on a similar scale. For example, one variable value may be on a scale that is much larger than the other and then these values are used in combination to make an evaluation about the entity associated with the values, then the evaluation may be skewed due to the differing scales. Preprocessing module 240 performs z-scaling techniques in order to advantageously improve convergence during training of a machine learning model on images produced by module 240 (relative to variable values that are not standardized via z-scaling). The preprocessing may prevent one or more features from dominating the model during inference due to differing scales in different variables used to generate images. As one example, if one variable value is 1000 and another variable value is 1, then the pixel intensities for these values within image 222 will be extremely different, with one being very bright relative to the other. The contrast between the two pixel intensities causes the image 232 to be distorted, which in turn will result in poor results when the image is fed into a trained machine learning model 140. As a result, z-scaling adjusts pixel intensities of image 232 prior to the image being input to a model. In the example above, z-scaling lowers the value 1000 to be a value between 2 and 50. For example, z-scaling may multiply the value 1000 by 0.025, resulting in a z-scaled value of 25.

In the illustrated embodiment, preprocessing module 240 outputs a model ready image 242. In some embodiments, preprocessing module 240 receives image 222 from image module 220 and performs z-scaling prior to pixel module 230 generating pixel-adjusted image 232. In such embodiments, preprocessing module 240 sends a z-scaled image 222 to pixel module 230 for pixel intensity assignment. In this way, preprocessing module 240 can perform the z-scaling either before or after the pixel intensity mapping. In embodiments where preprocessing module 240 performs z-scaling prior to pixel intensity mapping, pixel module 230 outputs a model ready image 242 after performing pixel intensity mapping. In various embodiments, transformation module 130 sends this model ready image to trained machine learning model 140 for prediction.

Example Image Generation

Figure 3:
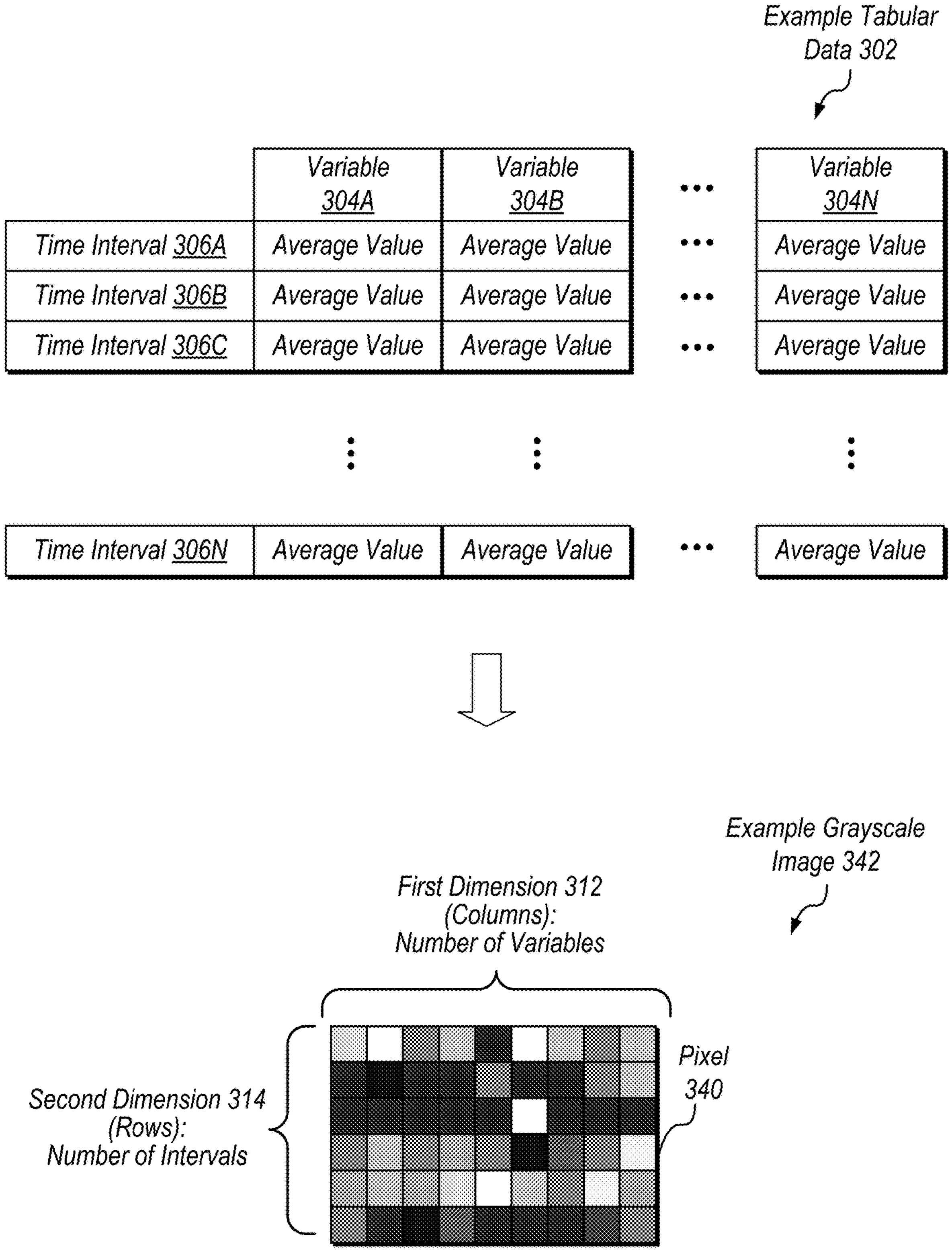
FIG. 3 is a block diagram illustrating example generation of an image from historical user data, according to some embodiments.

Turning now to FIG. 3, example generation of an image from historical user data is shown. In the illustrated embodiment, example tabular data stored in a table and an example grayscale image 342 generated from the tabular data is shown. For example, as discussed above with reference to FIG. 2, transformation module 130 executes temporal module 210, image module 220, pixel module 230, and preprocessing module 240 to store data 302 in tabular format and transform the tabular data into example grayscale image 342.

The top portion of FIG. 3 shows tabular data 302 that is stored in a table that includes rows for different time intervals 306A-306N and columns for different variables 304A-304N. In the illustrated embodiment, the values stored at the intersection of time intervals 306 and variables 304 are an average value for the given variable 304. For example, the average value stored for variable 304A corresponding to time interval 306A is the average of all values of variable 304A during the time interval 306A. As one specific example, if variable 304A is a transaction amount variable, then the value stored for this variable corresponding to time interval 306A is the average of all amounts for transactions initiated during a given week (one example of time interval 306A). Additional example variables and time intervals are discussed in further detail below with reference to FIG. 6A.

The bottom portion of FIG. 3 shows example grayscale image 342. This image includes a first dimension 312 that makes up the columns of image 342 which correspond to variables 304. For example, grayscale image 342 includes nine different columns indicating that there are nine different variables 304 stored for a given user. Image 342 also includes a second dimension 314 that makes up the rows of image 342 which correspond to time intervals 306. For example, grayscale image 342 includes six different rows indicating that there are six different time intervals 306 (e.g., six different subsets 154 of user data) in this example. Grayscale image 342 includes a plurality of pixels 340 whose grayscale intensities indicate the scale of the average values of the tabular data 302 stored in the table in the top portion of FIG. 3. In this example, the first pixel at the top left portion of image 342 is a smaller value (lower intensity/darker pixel) than the second pixel that is one column to the left of the first pixel (higher intensity/white pixel).

If request 112, discussed above with reference to FIG. 1, is a request to initiate an electronic communication, then example variables 304A-304N may include one or more of the following variables for the different time intervals 306A-306N: total transaction volume, transaction amount, timestamps, hardware and software information for computing device 110 (shown in FIG. 1) such as a device identifier or an internet protocol (IP) address or input and output ports, etc. Additional example variables included in tabular data are discussed in further detail below with reference to FIG. 6A.

Example Decision Module

Figure 4:
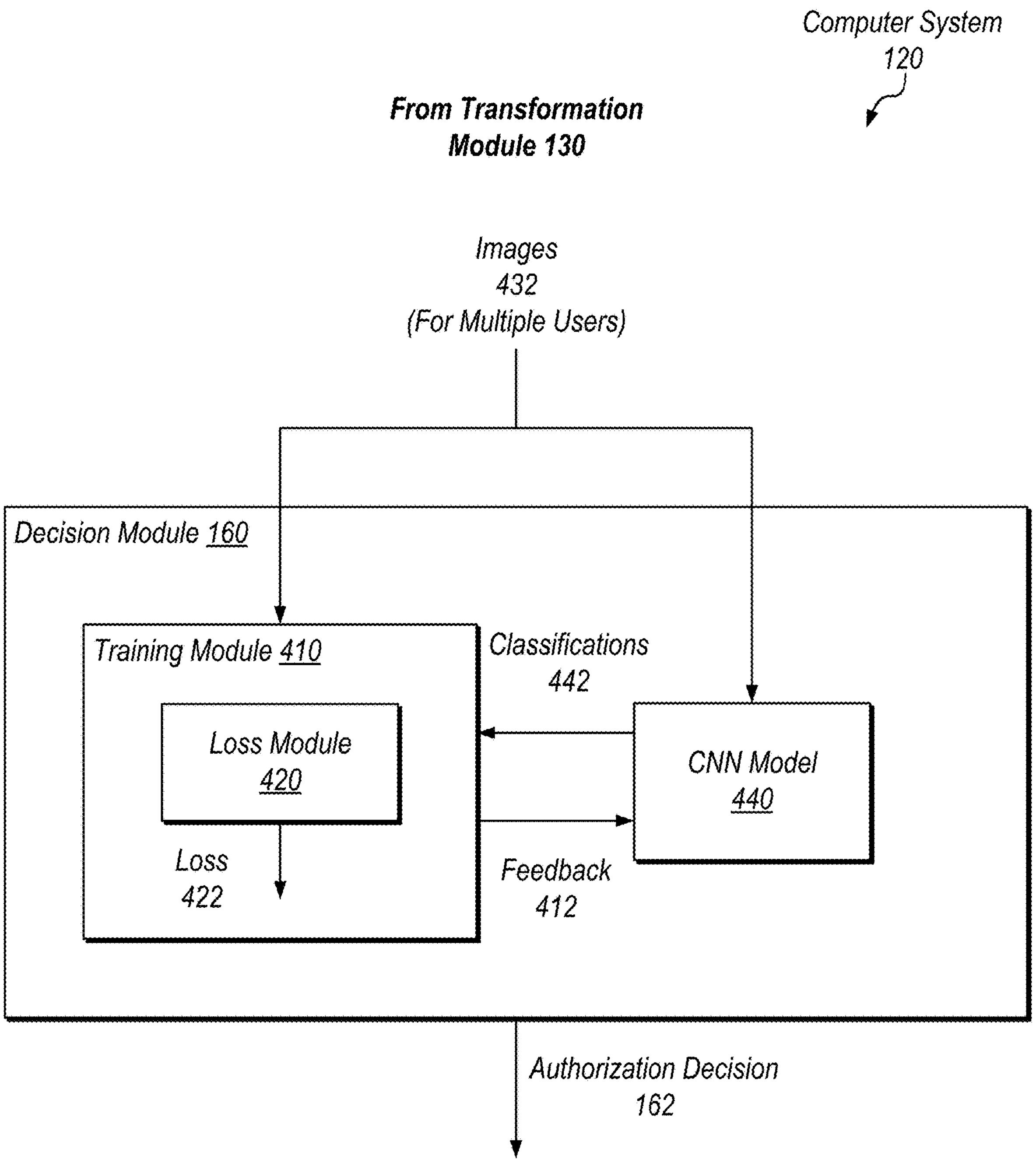
FIG. 4 is a diagram illustrating an example decision module, according to some embodiments.

FIG. 4 is a diagram illustrating an example decision module. In the illustrated embodiment, decision module 160 includes CNN model 440 and training module 410, which in turn includes loss module 420.

Decision module 160, in the illustrated embodiment, receives images 432 for multiple users from transformation module 130 (discussed above with reference to FIGS. 1 and 2) and inputs images 432 into both training module 410 and CNN model 440. Training module 410, in the illustrated embodiment, trains CNN model 440 by iteratively receiving classifications 442 for images 432 and sending feedback 412 to CNN model 440 to improve future predictions (e.g., classifications) made by model 440. For example, the feedback 412 performed by training module 410 includes automatically adjusting weights of the CNN model 440 through backpropagation. During each iteration, after inputting feedback 412 to CNN model 440 to adjust the model, training module 410 also re-inputs images 432 into the newly adjusted CNN model to make new predictions.

Training module 410, in the illustrated embodiment, receives classifications 442 from CNN model 440 and executes loss module 420 to determine a loss value 422 for CNN model 440 based on comparing the classifications 442 of the model with known labels for images 432. In various embodiments, the known labels are gathered for prior requests based on the outcome of those requests. As one example, if a user is approved for a loan and within the next 18 months, defaults on their loan more than two months in a row, then an image generated from the last 18 months of this user's data is labeled as "risky." This "risky labeled image is then usable to train CNN model 440. In this specific example, training module 410 trains CNN model 440 to classify the image as risky, such that this user will not be approved for additional loans. Alternatively, if CNN model 440 generates a classification 442 predicting incorrectly that the given image is "not risky," then training module 410 will send feedback 412 to model 440 to retrain the model to classify the given image as risky. Training module 410 performs training of CNN model 440 in an automated manner using machine learning techniques, including back-propagation as discussed above. For example, training module 410 is configured to automatically compare classifications 442 output by CNN model 440 with known labels for the training data images and automatically provide feedback according to the results of the comparison via back-propagation.

Loss module 420, in the illustrated embodiment, generates a loss value 422 based on feeding classifications 442 output by CNN model 440 into a loss function. During training, module 410 attempts to minimize the loss function executed by loss module 420 by adjusting CNN model 440 according to its (erroneous) classifications. In some embodiments, the loss function executed by loss module 420 is a cross-entropy loss function. For example, loss module 420 executes a version of the cross-entropy loss function referred to herein as a risk-adjusted binary cross-entropy (RABCE) loss function to determine an amount of loss for CNN model 440 based on its classifications 442. The RABCE loss function may advantageously provide a higher loss compared to traditional binary cross-entropy for certain model output. For example, the RABCE loss function includes a penalty term that increases the loss output by the loss function for misclassifying high-risk individuals (as discussed in the example above where the model misclassifies an image corresponding to a risky user). This term penalizes misclassified high risk individuals relative to misclassified low risk individuals, for example, if the model misclassifies a non-risky individual as high risk.

In the context of a loan approval prediction, if model 440 predicts a low probability of default on a loan, but the user actually defaulted, then the RABCE loss function penalizes the classified image (outputs a greater loss value 422 than for other scenarios). In various embodiments, the RABCE loss function adjusts the loss for CNN model 440 to account for the model's confidence in its predictions, penalizing low probabilities more severely when they result in misclassifications. Said another way, the loss function executed by loss module 420 places more importance on situations in which the user is "bad" (e.g., likely to default on their loan) than if the user is "good" (e.g., unlikely to default on their loan).

The following equation is the RABCE loss function equation executed by loss module 420 to determine the loss for various classifications output by CNN model 440 during training by training module 410. The parameter N represents the number of samples (e.g., the number of images 432 classified by CNN model 440), the parameter $y_i$ represents the known label for the i-th sample, and $\hat{y}_i$ represents the classification 442 output by CNN model 440 for the i-th sample (e.g., the predicted probability of default on a loan). In order for training module 410 to consider the training of CNN model 440 to be satisfactory, the values for $y_i$ and $\hat{y}_i$ need to be within a threshold similarity (the threshold maintained and compared by training module 410). For example, if the known probability of default is high (close to 1), then the predicted probability output by CNN model 440 also needs to be close to 1. In this situation, this fact is indicated by the RABCE loss function being close to or at 0 (i.e., the logarithmic value of 1 is 0). The disclosed loss function advantageously allows computer system 120 to put more emphasis on the "risky" users being classified as "risky" and lessens the focus on correctly predicted "non-risky" users. Further, in the loss function below, the α parameter is a weight parameter for the binary cross-entropy loss function term, β is a weight parameter for the penalty term, and γ is a parameter controlling the strength of the penalty for misclassifying high-risk users. The addition of the last term, a, gives more weight to classifying the high risk population correctly, while the weightage of a can be controlled by one or both of β and γ.

$$RABCE(y, \hat{y}) = \frac{1}{N}\sum_{i=1}^{N}[\alpha * y_i * \log(\hat{y}_i) + (1-\alpha) * (1-y_i) * \log(1-\hat{y}_i)] + \beta * \sum_{i=1}^{N}\left[\gamma * y_i * (\log(\hat{y}_i))^2\right]$$

As one example of loss function execution, loss module 420 executes the RABCE loss function equation shown above using the following values for each of the weighting parameters: α:0.6, B:0.1, γ:2. In various embodiments, the disclosed loss function implements the concept that it is more important for the model to identify users that meet a threshold probability of defaulting on their loans than to identify users that do not meet the threshold probability of defaulting. For example, it is more important for CNN model 440 to identify (i.e., for computer system 120 to evaluate) users that have approximately greater than 80% probability of default on their loans than users that have a less than 80% probability of default (i.e., computer system 120 will easy identify and block these users). In other examples, the interesting ranges of probabilities of default may differ, e.g., may be in the 60-70% range or above 90% range. More generally, it is more important for the disclosed system to identify users that will default than it is to identify users that will not default on their loans regardless of the range of probability of default. For example, while traditional loss functions give equal weight to mis-classifying defaulting and non-defaulting users (e.g., the positive and negative/good and bad classes), the disclosed loss function allows for increasing the penalty for giving a low probability to a defaulting user than for giving a high probability to a non-defaulting user.

Example CNN Model

Figure 5:
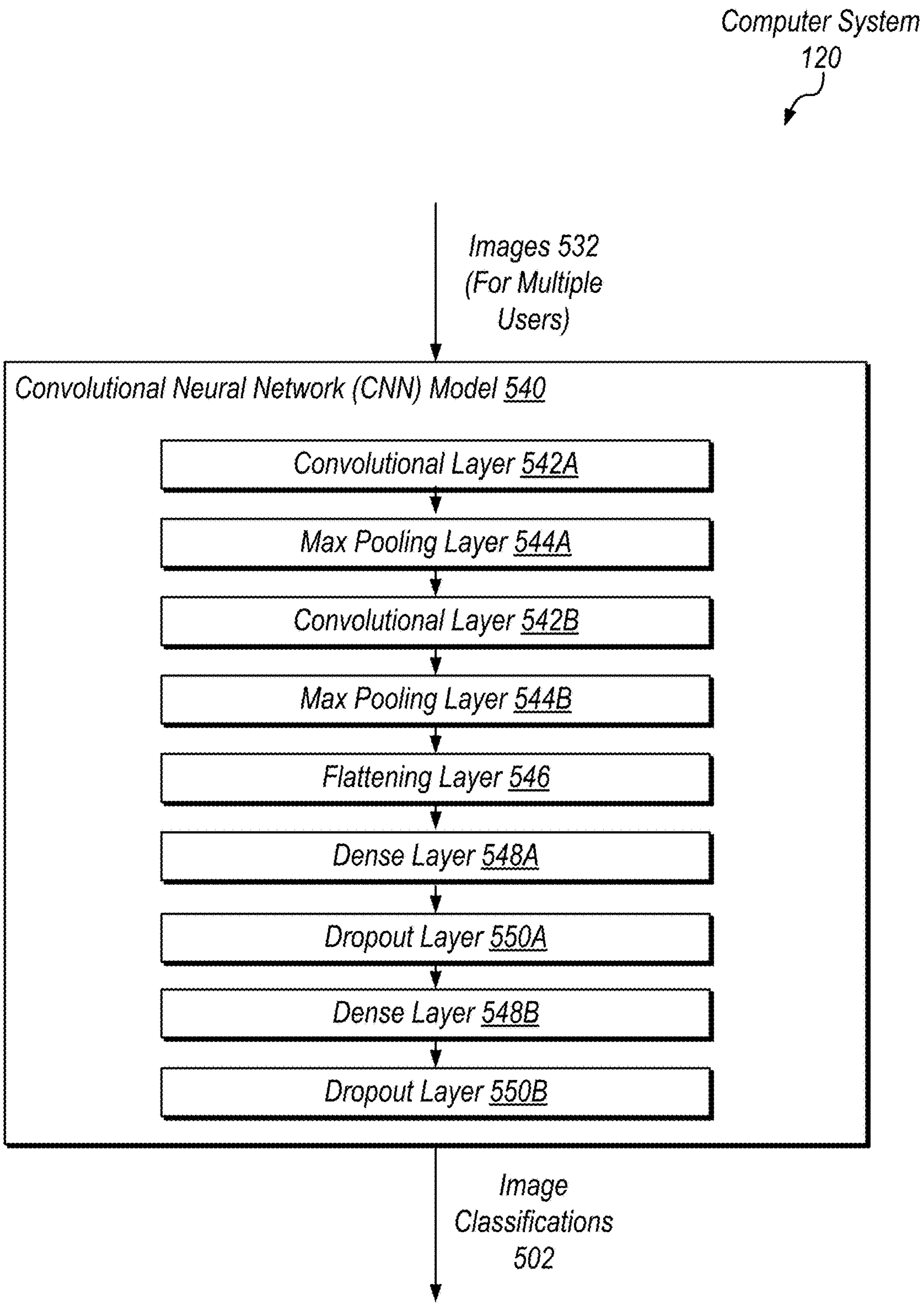
FIG. 5 is a block diagram illustrating an example convolutional neural network (CNN) model, according to some embodiments.

FIG. 5 is a block diagram illustrating an example convolutional neural network (CNN) model. In the illustrated embodiment, CNN model 540 receives images 532 for multiple users and outputs image classifications 502 for the images 532. In various embodiments, CNN model 540 is a trained model that computer system 120 executes to generate classifications 502 for images 532 corresponding to different users requesting various actions. As discussed above with reference to FIG. 1, these image classifications 502 (one example of model output 142) are used by decision module 160 to make authorization decisions 162 for various requested actions.

In the illustrated embodiment, CNN model 540 is a sequential model and includes the following layers: convolutional layer 542A, max pooling layer 544A, convolutional layer 542B, max pooling layer 544B, flattening layer 546, dense layer 548A, dropout layer 550A, dense layer 548B, and dropout layer 550B. For example, the first convolutional layer 542A and the second convolutional layer 542B might include 32 filters and a kernel matrix of size 3×3. As another example, the first max pooling layer 544A and the second max pooling layer 544B might include a kernel matrix of size of 2×2. Flattening layer 546 acts as a bridge between the convolution and pooling layers and the connected layers (dense and dropout layers), which perform classification and regression, by reshaping the input data to reduce the number of parameters in subsequent layers, for example. The first and second dense layers 548A and 548B include 128 and 64 nodes (i.e., neurons), respectively, and may capture patterns in image data in order to assist in classifying input images. As another example, the first dropout layer 550A and the second dropout layer 550B prevent overfitting and both include dropout rates of 0.5 (e.g., half the nodes in this layer are dropped at random).

As one example execution of CNN model 540, a grayscale image that has the dimensions 60×12×1 and includes pixel values that correspond to various pixel intensity levels is input to the CNN model 540. This image is convolved at convolutional layer 542A with 32 filters of size 3×3, resulting in 32 feature maps. At convolutional layer 542A each of the 32 filters slides over the input image and computes dot products at each position, which captures different features. The output of layer 542A includes 32 feature maps that have reduced dimensions due to the convolutional operation and are influenced by the learned filter weights. At max pooling layer 544A, CNN model 540 slides a pooling window of size 2×2 over each of the 32 feature maps output by convolutional layer 542A taking a maximum value in each window. This operation reduces the spatial dimensions of each feature map by half (e.g., from 58×10 to 29×5), retaining the most important feature information. At the second convolutional layer 542B, CNN model 540 convolved the 32 feature maps received from the max pooling layer 544A with 64 filters of size 3×3, where each filter extracts different features from the input feature maps similar to the first convolutional layer 542A. The resulting feature maps output by convolutional layer 542B have reduced dimensions due to the convolutional operation.

Further in this example, at max pooling layer 544B, CNN model 540 applies max pooling on each of the 64 feature maps output by the second convolutional layer 542B with a pooling window of size 2×2. This window slides over each feature map, taking the maximum value in each window, which further reduces the spatial dimensions of each feature map by half (in this case, from 27×3 to 13×2), retaining the most important information from the feature maps. The flattening layer 546 flattens the 64 feature maps obtained from the second max pooling layer 544B into a 1-dimensional vector. This transformation converts the spatial information into a linear array of values which can be fed into the subsequent fully connected layers. CNN model 540 executes two fully-connected dense layers 548A and 548B to compute a weighted sum of the flattened 1-dimensional vector output by the flattening layer 546 by applying an activation function (such as a rectified linear unit (ReLU) function) to introduce non-linearity. The dropout layers 550A and 550B, which each implement a dropout rate of 0.5, are executed after each dense layer 548A and 548B to prevent overfitting by randomly dropping a fraction of the neurons during training. In various embodiments, CNN model 540 passes the output from the last dense layer 548B through a final output layer (not shown) consisting of a single neuron with a sigmoid activation function. This sigmoid activation function squashes the output into the range [0, 1], e.g., representing the probability of an applicant defaulting on their loan.

In the illustrated embodiment, CNN model 540 outputs image classifications 502 that are determined based on changes in one or more variables between two or more subsets of a user's historical data. For example, an image classification 502 may indicate that a user is suspicious (e.g., risky) if there is a large change in one or more of their variables. As one specific example, if CNN model 540 detects that a user has missed three or more consecutive payments on a loan (e.g., on their credit card), then model 540 outputs a classification 502 indicating that this user is risky. Image classifications 502 output by CNN model 540 may be probability values on a scale of 0 to 1. For example, if a classification 502 for a particular image 532 is 0.2, this value indicates that a user corresponding to this image should not be approved for a new line of credit. In this example, CNN model 540 may output a score of 0.2 at least due to a variable indicating a ratio of the number of successful transactions to a number of denied transactions for this user decreasing from one month to the next (i.e., this user's transactions have been denied more often in recent months). Additional examples of variables and how they change over time are discussed in further detail below with reference to FIG. 6A.

Example Tabular Data and Image Generation

Figure 6A:
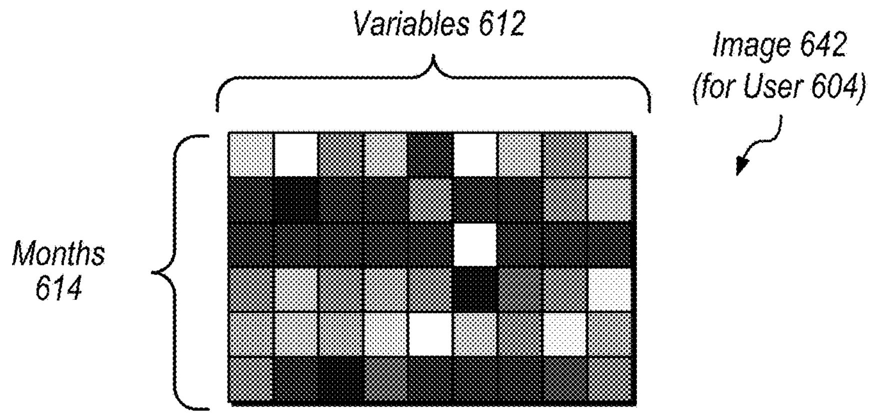
FIGS. 6A and 6B are block diagrams illustrating example tabular data and example images generated from the tabular data, according to some embodiments.
Figure 6B:
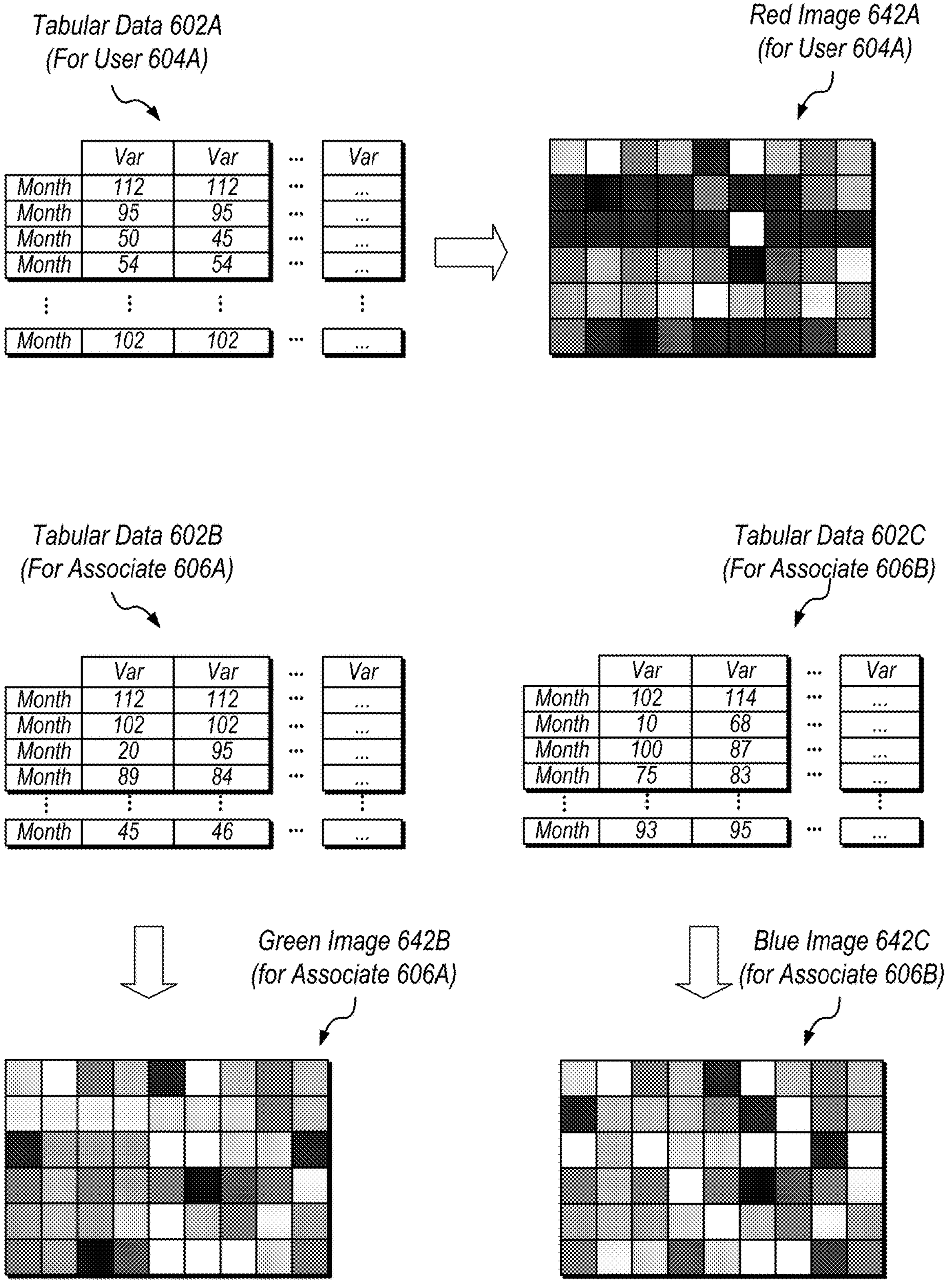

FIGS. 6A and 6B are block diagrams illustrating example tabular data and example images generated from the tabular data. In FIG. 6A, example tabular data 602 for a user 604 and an example image 642 generated by transformation module 130 from the tabular data 602 are shown. In FIG. 6B, three different examples of tabular data 602A, 602B, and 602C are shown as well as their corresponding images 642A, 642B, and 642C.

Turning now to FIG. 6A, tabular data 602 for a particular user 604 as well as an image 642 generated by transformation module 130 for user 604 based on tabular data 602 is shown. In the illustrated embodiment, tabular data 602 includes three example columns storing values for three different variables: a number of communications, approved communications, and a residence of user 604. Tabular data 602 includes values for these three different variables during the rows of monthly time intervals of January 30$^{th}$ through December 30$^{th}$. For example, during the month of January (i.e., a time interval of January 1$^{st}$ to January 30$^{th}$), user 604 initiated 112 electronic communications, with all 112 of those electronic communications being approved by a processing system, and during which time user 604 was renting their primary residence (the renter variable is represented by the value "1"). In contrast, in the row of tabular data 602 corresponding to July 30$^{th}$, user 604 initiated 95 electronic communications, 94 of which were approved by the processing system during which time user 604 owned their primary residence (the owner variable is represented by the value "2"). The tabular data 602 shown in FIG. 6A captures the temporal aspect of the different variables of user 604 by arranging the rows (January 30$^{th}$ to December 30$^{th}$) in sequential order, reflecting the evolution of this user's activity (i.e., how these variable values changed) over the past year.

While traditional systems consider the yearly average percentage of approved transactions which would stay at approximately 75% between December 2022 and December 2023, the disclosed techniques consider a month by month change in the average percentage of approved transactions (e.g., separately evaluate the average percentage of approved transactions for March 2022 and April 2022). The traditional yearly evaluation of this variable, however, disguises the fact that in a given month last year (e.g., April 2022), the user had only 30% of their transactions approved. In this example, the yearly evaluation of this variable that includes months other than April (i.e., an average of all 12 months for the previous year), these other months mask the poor (low) rate of approved transactions in April. By considering the monthly average percentage of approved transactions instead of the yearly average, the disclosed techniques capture nuances in variables lost using traditional techniques.

In various embodiments, tabular data 602 includes a plurality of different variables. For example, tabular data 602 includes sixty different variables for user 604. In addition to the three example variables shown in FIG. 6A, tabular data 602 may include one or more of the following variables for user 604: an average dollar amount declined during the quarter, a ratio of the number of denied transactions to a number of successful transactions, a minimum dollar amount declined, a ratio of a dollar amount of denied to successful transactions, a number of days since the oldest credit card on an account was added, a residence status, a time decay of minimum dollar amount of denied transactions, a date on file of the latest account added (e.g., bank account), an average dollar amount of successful transactions, days on which transfer of funds (TOF) of card (both credit and debit) transactions occur, a maximum dollar amount of successful transactions, a sum of denied transactions, a total amount spent, a ratio of an amount of successful to an amount of declined transactions, an amount spent via credit card transactions, a total number of successful transactions, a maximum dollar amount in the returned transactions, a total number of declined transactions, a number of days since a latest credit card was added, a total number of transactions initiated, a ratio of debit cards to credit cards, a percentage of credit card transactions relative to a total number of transactions, a number of unique instruments in a wallet. In some embodiments, historical user data that includes many different variables is obtained based on a user having an account with a processing system (e.g., PayPal™) for 6, 12, 18, etc. months. In other embodiments, however, a user has only had an account with the processing system for less than 6 months (has recently opened an account). In such situations, computer system 120 gathers historical user data from outside sources. For example, computer system 120 may gather data from one or more credit bureaus, other accounts of the user (e.g., bank accounts), surveying the user on their financial history, etc.

In the illustrated embodiments, image 642 includes pixels whose intensity is dictated by the values of variables 612 of user 604 during different month 614 time intervals. For example, this image 642 was generated by transformation module 130 for user 604 based on tabular data 602. While the example image 642 shown in FIG. 6A includes nine columns of variables 612 and six rows of months 614, images generated by transformation module 130 may include any of various numbers of different variables and time intervals. In various embodiments, each user will have a customer identifier (ID) assigned to a grayscale image (such as image 642) generated for the user for input to a CNN model for making a prediction about the user. As one example, the CNN model 540 discussed above with reference to FIG. 5 may predict based on an image, such as image 642 assigned a customer ID of "12145251," whether user 604 is likely to default on a loan within the next 12 months. In this example, CNN model 540 outputs a classification value between 0 and 1 for image 642. Classifications output by CNN model 540 are probabilities that an image belongs to one of class 0 (e.g., not risky) or class 1 (e.g., risky). The closer the probability value is to 0, the less likely that a user corresponding to this image is risky. Similarly, the closer the probability output by model 540 is to 1, the more likely that the user corresponding to this image is risky.

Turning now to FIG. 6B, the three example images shown are color images. For example, a red image 642A generated by transformation module 130 for user 604A based on tabular data 602A includes pixels with intensities in shades of red. Similarly, a green image 642B generated by transformation module 130 for an associate 606A of user 604A (e.g., a merchant with which the user is transacting) includes pixels with intensities in shades of green. A blue image 642C for associate 606B includes pixel intensities in shades of blue. Note that these different colors of images with different pixel intensities are represented using grayscale pixels. After generating red image 642A from tabular data 602A, green image 642B from tabular data 602B, and blue image 642C from tabular data 602C, transformation module 130 converts these three images into a single multi-colored, red-green-blue (RGB) image to be input to the CNN model 540 discussed above with reference to FIG. 5. This resulting RGB image includes three entity dimensions. For example, the dimensions of the multi-colored image are 60×12×3 (variables×intervals×entities). In other embodiments, transformation module 130 generates an RGB image for a single user based on three different years of data for this user. For example, transformation module 130 generates a red image for a first year, a green image for a second year, and a blue image for a third year for this user and then combines the three different images to generate a single RGB image for this user that represents data across multiple different years.

Example Method

Figure 7:
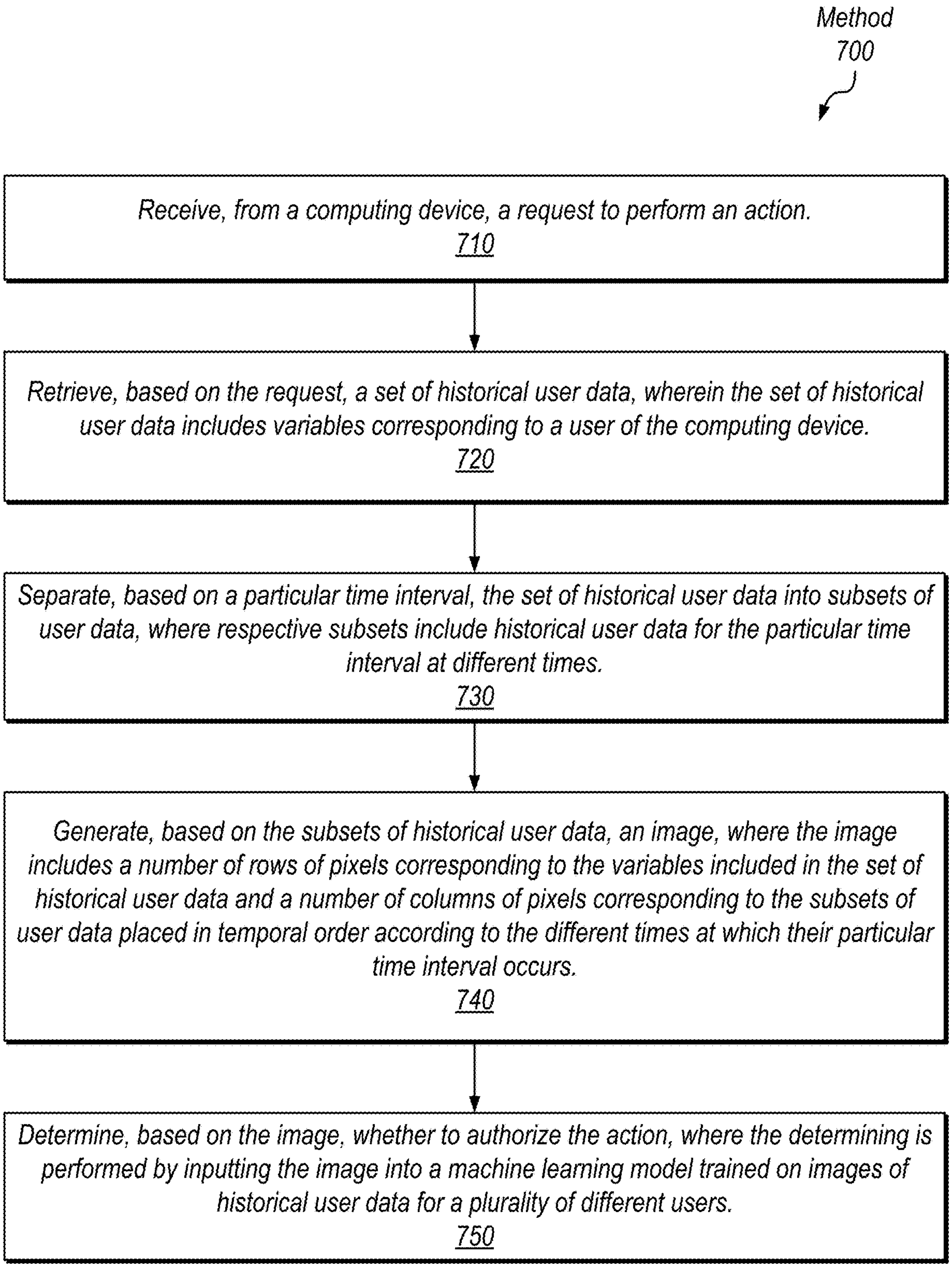
FIG. 7 is a flow diagram illustrating a method for making a prediction using a machine learning model based on historical user data that has been transformed into an image, according to some embodiments.

FIG. 7 is a flow diagram illustrating a method for making a prediction using a machine learning model based on historical user data that has been transformed into an image, according to some embodiments. The method 700 shown in FIG. 7 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In some embodiments, computer system 120 performs the elements of method 700.

At 710, in the illustrated embodiment, a computer system receives, from a computing device, a request to perform an action. In some embodiments, the request is a request to initiate an electronic communication. For example, the request is received from a user on their phone requesting to initiate an electronic transaction with a merchant. As another example, the request is received from a user requesting to open a new line of credit (e.g., the user wishes to be approved for a new credit card).

At 720, the computer system retrieves, based on the request, a set of historical user data, where the set of historical user data includes variables corresponding to a user of the computing device. In some embodiments, the computer system retrieves the set of historical user data from a database storing data for a plurality of different users. In some embodiments, the variables include information corresponding to prior user interactions with an application of the computer system downloaded on their computing device. In some embodiments, the variables include values indicating electronic communication activity of the user. For example, a variable indicates a total transaction volume of the user during different months of the past year.

At 730, the computer system separates, based on a particular time interval, the set of historical user data into subsets of user data, where respective subsets include historical user data for the particular time interval at different times. In some embodiments, the particular time interval is a month. In some embodiments, the set of historical data includes user data up to eighteen months prior to a time at which the request is submitted. In some embodiments, the separating further includes calculating, based on the set of historical data, an average variable value for variables in respective subsets of historical user data. In some embodiments, an average variable value for a first subset of historical user data is different than an average variable value for a second subset of historical user data. In some embodiments, the particular time interval is a week. In some embodiments, the set of historical data includes user data that occurred up to eighteen months prior to a time at which the request is submitted.

At 740, the computer system generates, based on the subsets of historical user data, an image, where the image includes a number of rows of pixels corresponding to the variables included in the set of historical user data and a number of columns of pixels corresponding to the subsets of user data placed in temporal order according to the different times at which their particular time interval occurs. In some embodiments, the computer system maps an intensity of the pixels included in the image to values of the variables included in the set of historical user data.

In some embodiments, the image is a multi-colored image. In some embodiments, the user of the user computing device is a first user. In some embodiments, generating the multi-colored image includes generating, based on the subsets of historical data for the first user, a first image corresponding to a first color. In some embodiments, generating the multi-colored image includes generating, based on subsets of a set of historical user data for a second user associated with the first user, a second image corresponding to a second color. In some embodiments, generating the multi-colored image includes generating, based on subsets of historical data for a third user associated with the first user, a third image corresponding to a third color. In some embodiments, generating the multi-colored image includes combining the first, second, and third images of different colors. In some embodiments, the multi-colored image includes three dimensions: a first dimension corresponding to a number of variables included in the historical data and a second dimension corresponding to a number of subsets of historical user data.

At 750, the computer system determines, based on the image, whether to authorize the action, where the determining is performed by inputting the image into a machine learning model trained on images of historical user data for a plurality of different users. In some embodiments, the machine learning model is a convolutional neural network (CNN) model. In some embodiments, training the CNN model includes generating a plurality of images from historical user data for a plurality of different users and inputting the plurality of images into the CNN model. In some embodiments, training the CNN model further includes feeding output of the CNN model for the plurality of images into a loss function and adjusting the CNN model to apply greater weight to images with greater loss function values than to images with smaller loss values. In some embodiments, the loss function penalizes low classifications output by the CNN model that are below a classification threshold more severely than other classifications output by the CNN model when the low classifications result in misclassifications. For example, it is more important to identify a user that defaults 70% of the time on their loans than it is to identify a user that defaults only 20% of the time. As such, the disclosed loss function, discussed above with reference to FIG. 4 includes several weighting parameters that increase the loss value output by the loss function for incorrect classifications indicating that a user is "not risky" when this user turns out to be risky (e.g., this user frequently defaults on their loans and should not be approved for future loans).

In some embodiments, training the CNN model includes feeding output of the CNN model for a plurality of images into a loss function. In some embodiments, the loss function applies greater weight to high risk classifications output by the CNN model that are misclassifications than to other classifications output by the CNN model. In some embodiments, training the CNN model further includes adjusting the CNN model to apply greater weight to images with greater loss function values than to images with smaller loss function values.

In some embodiments, generating the image further includes preprocessing one or more of the variables included in the subsets of historical user data. In some embodiments, the preprocessing includes adjusting a scale of values for different variables in a given subset relative to one another to prevent one or more features from dominating the machine learning model during training or inference.

In some embodiments, the computer system determines not to authorize the action based on output of the CNN model for the grayscale image. In some embodiments, the computer system performs, based on determining not to authorize the action, one or more preventative actions with respect to the user. In some embodiments, the preventative actions include one or more actions of the following types of actions: requesting an authentication factor from the user, blocking an account of the user, and transmitting the action to a system administrator for review.

In addition to method 700, and its variants, non-transitory, computer-readable media storing program instructions executable to implement such methods are also contemplated, along with systems configured to implement these methods.

The various techniques described herein may be performed by one or more computer programs. The term "program" is to be construed broadly to cover a sequence of instructions in a programming language that a computing device, such as computer system 120 or computing device 110 shown in FIG. 1, can execute. These programs may be written in any suitable computer language, including lower-level languages such as assembly and higher-level languages such as Python. The program may be written in a compiled language such as C or C++, or an interpreted language such as JavaScript.

Program instructions may be stored on a "computer-readable storage medium" or a "computer-readable medium" in order to facilitate execution of the program instructions by a computer system (such as computer system 120 discussed above with reference to FIG. 1). Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

Note that in some cases, program instructions may be stored on a storage medium but not enabled to execute in a particular computing environment. For example, a particular computing environment (e.g., a first computer system such as computer system 120 in FIG. 1) may have a parameter set that disables program instructions that are nonetheless resident on a storage medium of the first computer system. The recitation that these stored program instructions are "capable" of being executed is intended to account for and cover this possibility. Stated another way, program instructions stored on a computer-readable medium can be said to "executable" to perform certain functionality, whether or not current software configuration parameters permit such execution. Executability means that when and if the instructions are executed, they perform the functionality in question.

The present disclosure refers to various software operations that are performed in the context of one or more computer systems. Trained machine learning model 140 or transformation module 130 can each execute on respective computer systems, for example. Similarly, decision module 160 can be implemented on a computer system associated with a smartphone application (e.g., on computing device 110) based on information received from computer system

120. Each of these components, then, is implemented on physical structure (i.e., on computer hardware).

In general, any of the services or functionalities of a software development environment described in this disclosure can be performed by a host computing device, which is any computer system that is capable of connecting to a computer network. For example, computer system 120 or computing device 110 shown in FIG. 1 are examples of host computing devices capable of connecting to a computer network. A given host computing device can be configured according to any known configuration of computer hardware. A typical hardware configuration includes a processor subsystem, memory, and one or more I/O devices coupled via an interconnect. A given host computing device may also be implemented as two or more computer systems operating together.

The processor subsystem of the host computing device may include one or more processors or processing units. In some embodiments of the host computing device, multiple instances of a processor subsystem may be coupled to the system interconnect. The processor subsystem (or each processor unit within a processor subsystem) may contain any of various processor features known in the art, such as a cache, hardware accelerator, etc.

The system memory of the host computing device is usable to store program instructions executable by the processor subsystem to cause the host computing device to perform various operations described herein. The system memory may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read-only memory (PROM, EEPROM, etc.), and so on. Memory in the host computing device is not limited to primary storage. Rather, the host computing device may also include other forms of storage such as cache memory in the processor subsystem and secondary storage in the I/O devices (e.g., a hard drive, storage array, etc.). In some embodiments, these other forms of storage may also store program instructions executable by the processor subsystem.

The interconnect of the host computing device may connect the processor subsystem and memory with various I/O devices. One possible I/O interface is a bridge chip (e.g., Southbridge) from a front-side to one or more back-side buses. Examples of I/O devices include storage devices (hard drive, optical drive, removable flash drive, storage array, SAN, or their associated controller), network interface devices (e.g., to a computer network), or other devices (e.g., graphics, user interface devices.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation-[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:

receiving, by a computer system from a computing device, a request to perform an action;

retrieving, by the computer system based on the request, a set of historical user data, wherein the set of historical user data includes variables corresponding to a user of the computing device;

separating, by the computer system based on a particular time interval, the set of historical user data into subsets of user data, wherein respective subsets include historical user data for the particular time interval at different times;

generating, by the computer system based on the subsets of historical user data, an image, wherein the image includes a number of rows of pixels corresponding to the variables included in the set of historical user data and a number of columns of pixels corresponding to the subsets of user data placed in temporal order according to the different times at which their particular time interval occurs; and determining, by the computer system based on the image, whether to authorize the action, wherein the determining is performed by inputting the image into a machine learning model trained on images of historical user data for a plurality of different users.

2. The method of claim 1, wherein the machine learning model is a convolutional neural network (CNN) model, and wherein training the CNN model includes:
generating, from the historical user data for the plurality of different users, a plurality of images;
inputting the plurality of images into the CNN model;
feeding output of the CNN model for the plurality of images into a loss function; and
adjusting the CNN model to apply greater weight to images with greater loss function values than to images with smaller loss values.

3. The method of claim 2, wherein the loss function penalizes low classifications output by the CNN model that are below a classification threshold more severely than other classifications output by the CNN when the low classifications result in misclassifications.

4. The method of claim 1, wherein generating the image further includes:
preprocessing one or more of the variables included in the subsets of historical user data, wherein the preprocessing includes adjusting a scale of values for different variables in a given subset relative to one another to prevent one or more features from dominating the machine learning model during training or inference.

5. The method of claim 1, further comprising:
mapping, by the computer system, an intensity of the pixels included in the image to values of the variables included in the set of historical user data.

6. The method of claim 1, wherein the particular time interval is a month, and wherein the set of historical data includes user data up to eighteen months prior to a time at which the request is submitted.

7. The method of claim 1, wherein the separating further includes:
calculating, based on the set of historical data, an average variable value for variables in respective subsets of historical user data, wherein an average variable value for a first subset of historical user data is different than an average variable value for a second subset of historical user data.

8. The method of claim 1, wherein the image is a multi-colored image, wherein the user of the user computing device is a first user, and wherein generating the multi-colored image includes:
generating, based on the subsets of historical data for the first user, a first image corresponding to a first color;
generating, based on subsets of a set of historical user data for a second user associated with the first user, a second image corresponding to a second color;
generating, based on subsets of historical data for a third user associated with the first user, a third image corresponding to a third color; and
combining the first, second, and third images of different colors.

9. The method of claim 8, wherein the multi-colored image includes three dimensions: a first dimension corresponding to a number of variables included in the historical data and a second dimension corresponding to a number of subsets of historical user data.

10. A non-transitory computer-readable medium having instructions stored thereon that are executable by a server system to perform operations comprising:
receiving, from a computing device, a request to perform an action;
retrieving, based on the request, a set of historical user data, wherein the set of historical user data includes variables corresponding to a user of the computing device;
separating, based on a particular time interval, the set of historical user data into subsets of user data, wherein respective subsets include historical user data for the particular time interval at different times;
generating, based on the subsets of historical user data, a grayscale image, wherein the grayscale image includes a number of rows of pixels corresponding to the variables included in the set of historical user data and a number of columns of pixels corresponding to the subsets of user data placed in temporal order according to the different times at which their particular time interval occurs;
inputting the grayscale image into a trained convolutional neural network (CNN) model; and
determining, based on output of the trained CNN model, whether to authorize the action.

11. The non-transitory computer-readable medium of claim 10, wherein training the CNN model includes:
feeding output of the CNN model for a plurality of images into a loss function, wherein the loss function applies greater weight to high risk classifications output by the CNN model that are misclassifications than to other classifications output by the CNN model; and
adjusting the CNN model to apply greater weight to images with greater loss function values than to images with smaller loss values.

12. The non-transitory computer-readable medium of claim 10, wherein generating the grayscale image includes:
preprocessing one or more of the variables included in the subsets of historical user data, wherein the preprocessing includes adjusting a scale of values for different variables in a given subset relative to one another to prevent one or more features from dominating the CNN model during training or inference.

13. The non-transitory computer-readable medium of claim 10, wherein the separating further includes:
calculating, based on the set of historical data, an average variable value for variables in respective subsets of historical user data, wherein an average variable value for a first subset of historical user data is different than an average variable value for a second subset of historical user data.

14. The non-transitory computer-readable medium of claim 10, wherein the operations further comprise:
determining not to authorize the action based on output of the CNN model for the grayscale image; and
performing, based on determining not to authorize the action, one or more preventative actions with respect to the user, including one or more actions of the following types of actions: requesting an authentication factor from the user, blocking an account of the user, and transmitting the action to a system administrator for review.

15. The non-transitory computer-readable medium of claim 10, wherein the particular time interval is a week, and wherein the set of historical data includes user data that occurred up to eighteen months prior to a time at which the request is submitted.

16. A system comprising:
a processor; and a non-transitory computer-readable medium having stored thereon instructions that are executable by the processor to cause the system to perform operations comprising:

receiving, from a computing device, a request to authorize an action;

determining, using a trained machine learning model, whether to authorize the action, wherein the trained machine learning model is trained by:

retrieving, based on the request, different sets of historical user data for a plurality of users, wherein the different sets of historical user data include variables corresponding to different ones of the plurality of users;

separating, based on a particular time interval, the different sets of historical user data into subsets of user data, wherein respective subsets include historical user data for the particular time interval at different times;

generating, for the sets of historical user data and based on their respective subsets, images, wherein the images include a number of rows of pixels corresponding to the variables and a number of columns of pixels corresponding to the subsets of user data placed in temporal order according to the different times at which their particular time interval occurs; and inputting the images into the machine learning model.

17. The system of claim 16, wherein the instructions are further executable by the processor to cause the system to perform further operations comprising:

feeding output of the machine learning model for the images into a loss function, wherein the loss function penalizes low classifications output by the machine learning model that are below a classification threshold more severely than other classifications output by the machine learning model when the low classifications result in misclassifications, and wherein training the machine learning model further includes:

adjusting the machine learning model to apply greater weight to images with greater loss function values than to images with smaller loss values.

18. The system of claim 17, wherein the images are multi-colored images that include three dimensions: a first dimension corresponding to a number of variables included in the sets of historical user data, a second dimension corresponding to a number of subsets of historical user data, and a third dimension corresponding to two or more users whose historical data is used to generate a given multi-colored image.

19. The system of claim 16, wherein the particular time interval is a month, and wherein the different sets of historical data include user data up to eighteen months prior to a time at which the request is submitted.

20. The system of claim 16, wherein the trained machine learning model is a convolutional neural network.

* * * * *